United States Patent [19]
Wheatley, Jr.

[11] 3,726,299
[45] Apr. 10, 1973

[54] HEAT RESPONSIVE SAFETY VALVE

[76] Inventor: Thomas Wheatley, Jr., 3717 Pinemont St., Houston, Tex. 77018

[22] Filed: Jan. 21, 1971

[21] Appl. No.: 108,345

[52] U.S. Cl. ................................. 137/75, 251/287
[51] Int. Cl. ........................................... F16k 17/38
[58] Field of Search ................. 122/504.1, 504.3; 126/287.5; 98/86; 137/67, 72–77, 65; 160/1; 251/66

[56] References Cited

UNITED STATES PATENTS

| | | | |
|---|---|---|---|
| 997,147 | 7/1911 | McDonald et al. | 137/75 |
| 1,022,119 | 4/1912 | Barton | 137/75 |
| 2,820,474 | 1/1958 | Greenwood et al. | 137/536 |
| 1,151,764 | 8/1915 | Dodson | 220/89 B |
| 1,331,025 | 2/1920 | Riggin | 251/315 X |
| 1,352,255 | 9/1920 | Emerson | 126/287.5 |
| 1,840,959 | 1/1932 | Kraft | 137/75 |
| 1,981,200 | 11/1934 | Schultz | 126/287.5 X |

*Primary Examiner*—Martin P. Schwadron
*Assistant Examiner*—Richard Gerard
*Attorney*—Charles E. Lightfoot

[57] ABSTRACT

A valve assembly for use in a pipeline which is to be closed in response to the occurrence of high temperature conditions such as a fire. The valve is of a type which effectively closes the pipe without the use of seal forming elements likely to be rendered ineffective by fire. The assembly includes means for yieldingly urging the valve toward closed position and heat responsive means is provided for releasably holding the valve in open position and for releasing the same when the temperature rises above a predetermined value. Means is also provided for arresting the opening movement of the valve when the valve reaches its fully closed position.

7 Claims, 2 Drawing Figures

Thomas Wheatley, Jr.
INVENTOR

BY Charles E. Lightfoot
ATTORNEY 3,726,299

HEAT RESPONSIVE SAFETY VALVE

BACKGROUND OF THE INVENTION

In the operation of various kinds of piping systems, it is often desirable to provide means for closing the pipe against the flow of fluid therethrough in response to the occurrence of an emergency condition, such as the event of fire.

Heretofore, numerous types of valves have been proposed which are intended for operation in response to the occurrence of high temperature conditions to close a flow line. Most such valves as heretofore commonly constructed, however, include seal forming elements of various kinds which are likely to be destroyed or rendered ineffective when exposed for long periods of time to high temperature conditions of the kind for which such valves are intended to operate to shut down the flow line, with the result that leakage often takes place.

Valves of this kind are particularly useful in flow lines carrying fuel or other combustible materials and to enable them to effectively perform their function, must be leakproof under exposure to high temperatures for long periods of time. Valves for the purpose mentioned must also be positive in action and capable of operation with a minimum of resistance to closing movement while providing adequate sealing between the parts.

SUMMARY OF THE INVENTION

The valve of the present invention, briefly described, comprises a valve housing formed in parts which are threadedly secured together and shaped internally to form a valve seat for a rotatable valve member, which, in the present illustration, is of spherical shape.

The valve has an operating stem which is enclosed and which is operated by a spring positioned for coaction with the housing and stem to yieldingly urge the valve toward closed position.

Stop means is provided on the rotatable member and housing positioned for coaction to arrest rotation of the member when the member reaches its closed position.

The rotatable member is releasably held in its open position by means, such as a fusible plug, which functions in response to a predetermined increase in temperature, such as might occur during a fire, to release the rotatable member for rotation to its closed position.

The fusible plug may be shaped or provided with means for rendering the same more readily responsive to an increase in temperature to release the rotatable member.

The housing and rotatable member are shaped for coaction without the use of seal forming elements to close the flowway and to resist leakage due to prolonged exposure to high temperatures, and the operating parts of the assembly are enclosed so that the use of seal forming elements about the valve stem and other operating parts is unnecessary.

DETAILED DESCRIPTION OF A PARTICULAR EMBODIMENT OF THE INVENTION

Figure 1:
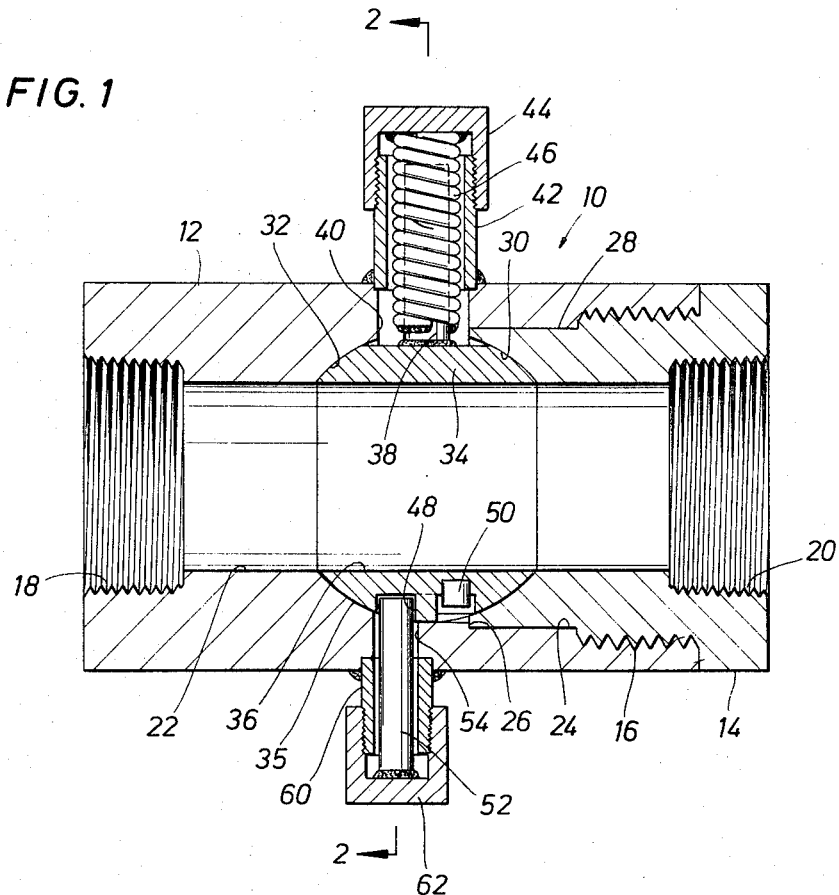
FIG. 1 is a longitudinal, central, cross sectional view of a preferred embodiment of the invention, showing the valve in its open position; and, FIG. 2 is a cross sectional view taken along the line 2 — 2 of FIG. 1, looking in the direction indicated by the arrows.

The valve of the invention comprises a valve body or housing, generally designated 10, which in the present illustration is made up of two cylindrical parts 12 and 14, threadedly secured together, as seen at 16, and each internally threaded at its outer end, as shown at 18 and 20, respectively, for convenience in connecting the body into a flow line in the usual manner.

The parts, when assembled, provide a longitudinal bore 22 through the body constituting the flowway of the valve.

The part 12 may be formed with a counterbore portion 24 forming an internal shoulder 26, and the part 14 has an externally reduced portion 28 fitted into the counterbore 24 and whose inner end may be seated against the shoulder 26.

The part 14 is formed with a spherically shaped inner surface 30 at its inner end and the part 12 has an inner spherically shaped surface 32 located inwardly of the shoulder 26, the surfaces 30 and 32 forming a valve seat when the parts are assembled.

Within the valve body 10, a valve member 34 is rotatably mounted, which member is of spherical shape externally, as shown at 35, for engagement with the seating surfaces 30 and 32, and is formed with a bore 36 which forms a part of the flowway 22 when the valve is open.

The valve member 34 is preferably of a size to closely fit the valve seat and the seating surfaces 30 and 32 of the body and spherical surface 35 of the member may be lapped to provide sealing engagement between the member and the body.

The member 34 and body 10 may be formed of suitable material, such as chrome steel, or the like, to provide protection against corrosion and which will effectively withstand high temperatures in the event that the valve should be exposed to fire.

The member 34 has an operating stem 38 which is rotatably extended through an opening 40 in the body, and externally of the body the stem is surrounded by a tubular extension 42, suitably attached to the body in surrounding relation to the opening 40, as by welding, and which encloses the stem. At its outer end, the extension or bonnet 42 carries a cap 44, threadably secured thereto and to which the outer end of a coil spring 46 is attached, as by welding, which spring surrounds the stem 38 in the bonnet and is connected thereto at its inner end, as by welding. The spring 46 is positioned for coaction with the body and stem to yieldingly urge the member 34 in a direction to close the valve.

The member 34 also has an external, annular groove 48, opposite the stem 38 and preferably concentric therewith, and within which a stop element 50, which may take the form of a pin or lug, is located, which is rotatable in the groove in response to rotational movement of the member.

A stop pin 52 is extended through an opening 54 in the body into the groove 48 of the member 10 in position for engagement with the element 50 to arrest rotational movement of the member when the member reaches closed position, but which allows rotation of the member to open position.

The body 10 has a tubular extension 60 extending externally therefrom in surrounding relation to the opening 54 through which the pin 52 is rotatably extended and the extension 60 is provided at its outer end with a screw cap 62 to which the pin 52 is attached.

Figure 2:
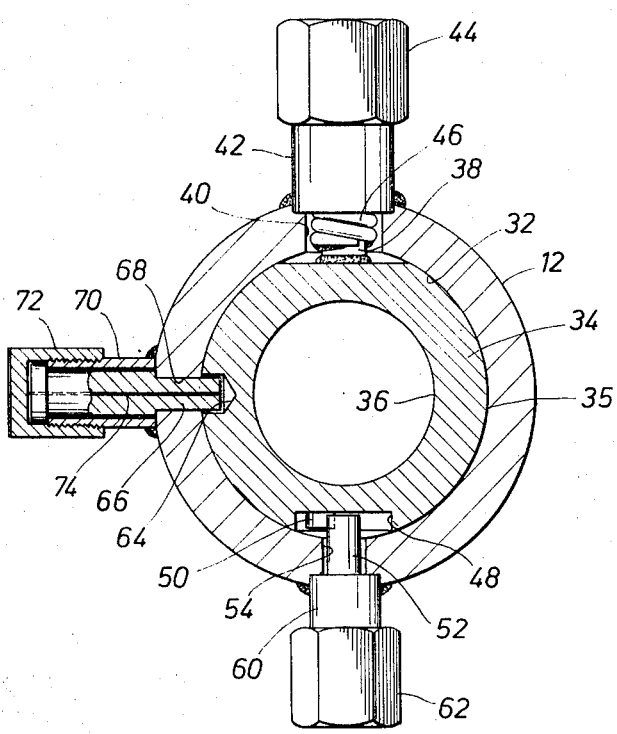

The member 34 also has a hole 64 formed in its outer surface into which the inner end of a fusible plug 66 is extended, which plug extends through an opening 68 in the body 10. A tubular extension 70 is provided on the body in surrounding relation to the opening 68, and into which the plug 66 extends, which plug may be formed with an external shoulder positioned to seat against the external surface of the body about the opening 68, as shown in FIG. 2.

A screw cap 72 is threadedly secured to the outer end of the extension 70 to close the same.

The fusible plug may be formed of a suitable material, such as lead or an alloy capable of melting at any desired predetermined temperature, and may have a central bore extending longitudinally thereof, or may be provided with a central wire or rod 74, formed of heat conducting material such as copper, or other means for assuring the rapid conduction of heat to the plug to cause prompt melting thereof when the temperature reaches a predetermined value.

The hole 64 is located at a position such that the valve member 34 will be held in its open position, against the pressure of the spring 46 when the plug is in the hole until the member is released by fusing of the plug.

In the operation of the valve, constructed as described above, the valve will normally be in its fully open position, as illustrated, with the fusible plug 66 extending into the hole 64 to hold the valve open against the tension of the spring 46 yieldingly urging the valve toward closed position.

When the temperature of the valve assembly rises to a point to fuse the plug 66, such as might occur in the event of a fire, the member 34 will be released to allow the spring to rotate the member to closed position, whereupon the pin 52 will be engaged by the element 50 to arrest the member in its closed position.

It will be apparent that due to the complete enclosure of the valve operating mechanism, no leakage may take place about the valve stem or through the fusible plug opening, such as might occur in the use of a valve having externally exposed operating parts.

It will thus be seen that the invention provides a safety valve for use in connection with piping systems, which are likely to be exposed to fire or high temperatures, and by which a fuel line or other piping will be closed against the flow of fluid therethrough in response to the occurrence of a fire.

Having thus clearly shown and described the invention, what is claimed as new and desired to secure by Letters Patent is:

1. A valve that is adapted to be mounted in a flow line and that is movable between first and second valving positions to control flow through the flow line, comprising a housing having a flow way therethrough, and also having means for connection in a flow line so that the valve controls flow through the flow line;

a spherical valve element disposed in said housing;

means for positioning said valve element for movement in said housing between said first and second positions;

a conforming internal surface in said housing co-aCting with said spherical valve element to close said flow way to fluid flow;

actuating means co-acting with said housing and said valve element for urging said valve element to move from the first position to the second position;

temperature responsive lock means cooperatively arranged with said housing and said valve element to engage said valve element for holding said valve element in the first position, said means being sufficiently responsive to temperatures above a predetermined level to permit said valve element to move to the second position;

a stem connected to said spherical valve element and rotatably supporting said element for movement between the first position and the second position;

a stop means;

a shoulder co-acting with said stop means; and said shoulder and said stop means being cooperatively arranged between said spherical valve element and said housing to permit rotation of said spherical valve element between the first and the second position whereupon said stop means engages said shoulder.

2. The invention of claim 1 wherein said stop means protrudes into a groove concentric with an axis of rotation of said valve element, and said shoulder comprises a portion of said groove.

3. The invention of claim 2 wherein said groove is in said valve element.

4. A valve that is adapted to be mounted in a flow line and that is movable between first and second valving positions to control flow through the flow line, comprising a housing having a flow way therethrough, and also having means for connection in a flow line so that the valve controls flow through the flow line;

a spherical valve element disposed in said housing;

means for positioning said valve element for movement in said housing between said first and second positions;

an internal surface in said housing co-acting with said valve element to close said flow way to fluid flow;

actuating means co-acting with said housing and said valve element for urging said valve element to move from the first position to the second position;

temperature responsive lock means cooperatively arranged with said housing and said valve element to engage said valve element for holding said valve element in the first position, said means being sufficiently responsive to temperatures above a predetermined level to permit said valve element to move to the second position;

a flow way formed in said spherical valve element;

a stem connected to and supporting said spherical element for rotation about an axis perpendicular to its flow way; and an opening means formed part-way into said spherical valve element, said temperature responsive lock means including a rod of fusible material in said opening means and an opening means in said housing, said rod also extending thereinto.

5. The invention of claim 4 wherein said rod is surrounded by a second housing sealed to said housing and said rod is adapted to be melted by heat applied to said rod for disengaging said rod from said valve element.

6. The invention of claim 4 including a centrally positioned heat transfer member in said rod.

7. The invention of claim 4 wherein said rod is approximately perpendicular to said stem.

* * * * *